(12) United States Patent
Hiroi et al.

(10) Patent No.: US 7,876,994 B2
(45) Date of Patent: Jan. 25, 2011

(54) OPTICAL FIBER ARRAY

(75) Inventors: Noriyoshi Hiroi, Sagamihara (JP); Yoshihide Hashimoto, Warabi (JP); Koji Matsumoto, Hachioji (JP)

(73) Assignee: Olympus Corporation, Tokyo (JP)

( * ) Notice: Subject to any disclaimer, the term of this patent is extended or adjusted under 35 U.S.C. 154(b) by 64 days.

(21) Appl. No.: 12/378,780

(22) Filed: Feb. 18, 2009

(65) Prior Publication Data

US 2009/0285533 A1   Nov. 19, 2009

(30) Foreign Application Priority Data

Feb. 20, 2008   (JP)   ............... 2008-038518

(51) Int. Cl.
*G02B 6/00*   (2006.01)

(52) U.S. Cl. .................................... 385/137

(58) Field of Classification Search ............ None
See application file for complete search history.

(56) References Cited

U.S. PATENT DOCUMENTS

| | | | |
|---|---|---|---|
| 4,880,494 A * | 11/1989 | Kaukeinen et al. | 216/24 |
| 5,574,817 A * | 11/1996 | Henson et al. | 385/114 |
| 7,162,115 B2 | 1/2007 | Brophy et al. | |
| 2003/0095776 A1 * | 5/2003 | Saito et al. | 385/137 |
| 2003/0169995 A1 * | 9/2003 | Song et al. | 385/137 |
| 2009/0190886 A1 * | 7/2009 | Shimotsu | 385/83 |

FOREIGN PATENT DOCUMENTS

| | | | |
|---|---|---|---|
| JP | 63-231404 A | * | 9/1988 |
| JP | 09-005576 | | 1/1997 |
| JP | 2002-040284 | | 2/2002 |

* cited by examiner

*Primary Examiner*—Mike Stahl
(74) *Attorney, Agent, or Firm*—Kenyon & Kenyon LLP

(57) ABSTRACT

An optical fiber array is formed by including m number of optical fibers (where, m is a natural number other than 0), an optical fiber aligning member on a surface of which, at least m number of grooves are formed in parallel, and a cover. An end portion of the optical fiber is disposed in the groove of the optical fiber aligning member, and is held by the optical fiber aligning member and the cover. Furthermore, when being held by the optical fiber aligning member and the cover, by setting a line segment which has connected a point on an outer periphery in contact with the cover, of the optical fiber to be a straight line, the optical fiber is supported at three points by the groove and the cover. Moreover, by setting an angle of formation of the groove to be constant for all the grooves, and by setting arbitrarily a depth of the groove to differ, and by setting arbitrarily a cladding diameter of the optical fiber arranged in the groove, a line segment which has connected a center of each of the m number of optical fibers disposed in the groove is set to be an arbitrary non straight line shape.

6 Claims, 20 Drawing Sheets

OPTICAL FIBER ARRAY

CROSS-REFERENCE TO RELATED APPLICATION

The present application is based upon and claims the benefit of priority from the prior Japanese Patent Application No. 2008-038518 filed on Feb. 20, 2008; the entire contents of which are incorporated herein by reference.

BACKGROUND OF THE INVENTION

1. Field of the Invention

The present invention relates to an optical fiber array, and particularly to a structure of an end portion of an optical fiber.

2. Description of the Related Art

In recent years, increase in a capacity and a speed of an optical communication network has been facilitated due to a progress in optical fiber communication. With such a trend, an optical fiber array has been used highly frequently as a constituent element which forms an optical splitter which divaricates an optical fiber into a plurality (for example eight) fibers, an optical demultiplexer which separates light according to each wavelength range, and further, an optical switch which converts a direction of light. An optical fiber array has been used as an optical coupling means in optical guided wave path components and optical demultiplexers.

An example of such optical fiber array will be described below while referring to an example of use. An optical guided wave path component is one of components that form an optical transmission body. The optical guided wave path component, as shown in FIG. 13, has a guided wave path substrate 101 and a cover 102 which is disposed on the optical guided wave path substrate 101. Furthermore, a plurality of cores 103 is disposed in a state of being exposed at a predetermined position and at a predetermined interval on a guided wave path substrate terminal portion 104 which is a connecting end surface with a terminal portion of another optical transmission body. An optical fiber array 105 shown in the same FIG. 13 is to be connected to an optical guided wave path component 100 which includes the guided wave path substrate 101. The optical fiber array 105 includes a plurality of optical fibers 106 and a substrate 107, and a V-groove 108 which holds a terminal of the optical fiber 106 is disposed at a predetermined interval in a straight line on the substrate 107. A predetermined number of the plurality of optical fibers 106 is disposed in a row in the V-groove 108, and stuck by an adhesive and fixed by a cover 109.

The optical guided wave path component 100 and the optical fiber array 105 are connected by matching the optical fiber array 105 and the cores 103 face-to-face, and then by fixing by adhering both terminals, after the alignment is carried out. Moreover, for connecting optical fibers which form an optical transmission body, it is common to use a multi-fiber optical connector.

Moreover, as another example of use of an optical fiber array, a structure of an optical demultiplexer will be described below.

In FIG. 14, there is shown an optical demultiplexer 110 in which, a diffraction grating 114 which separates a wavelength multiplexed signal in multi-spectral channels at a wavelength unit, and focuses on an array of corresponding channel micro mirrors 111 is used. Each of The channel micro mirrors 111 are controllable individually to reflect a spectral channel to a multi-output port 112, and can be rotated continuously. The optical demultiplexer 110 is capable of routing a spectral channel according to a wavelength as a base, and is capable of combining an arbitrary spectral channel at an arbitrary at any multi-output port 112. Furthermore, the optical demultiplexer 110 is provided with a servo control and a spectrum output controlling capability, by which, the optical demultiplexer 110 maintains an efficiency of combining the spectral channels at the multi-output port 112. Such optical demultiplexer 110 is used for structuring a dynamically reconfigurable optical add drop multiplexer (ROADM) of a new type by a wavelength division multiplexing (WDM) optical networking application.

A wavelength multiplexed signal, after being emerged from an input port 113, is incident on the diffraction grating 114, and diffracted. Since an angle of diffraction of diffracted light becomes an angle corresponding to a wavelength by an action of the diffraction grating 114, the diffracted light after passing through a lens 115, is reflected at the channel micro mirror 111, and is combined at the respective multi-output port 112. As an optical guided wave path component which forms the input port 113 and the multi-output port 112, an optical fiber array is used.

In the optical guided wave path component 100 shown in FIG. 13, the core 103 and a cladding which covers the core 103 are stacked on the guided wave path substrate 101. Since each of materials forming the guided wave path substrate 101, the core 103, and the cladding respectively is different, there is a difference in a coefficient of linear expansion. Thereby, warpage is occurred in the optical guided wave path component 100 according to the difference in a coefficient of linear expansion. Therefore, in many cases, a line segment which connects axis centers of the cores 103 in a connecting end surface becomes a predetermined curve. Consequently, as shown in FIG. 13, since it is not possible to connect the core 103 and the optical fiber 106 concentrically by connecting the optical guided wave path component 100 and the optical fiber array 105 in which, the optical fibers 106 are arranged in a row in straight line and fixed, in the V-groove which is formed in a straight line, and a joint loss becomes substantial thereby posing a problem.

Moreover, a resolution of the optical demultiplexer 110 in FIG. 14 is determined by a focal length of the lens 115 and a resolution of the diffraction grating 114 (concretely, an amount of wavelength-angle dispersion of diffraction grating) However, as shown in FIG. 17, in a case of providing a plurality of input ports 113, an optical signal which is incident from the optical fiber 106 of a port arranged in row at a further outer side, is incident on the diffraction grating 114 at angle of inclination. The angle of incidence of the optical signal with respect to the diffraction grating 114 being different for each port for the abovementioned reason (the angle of incidence changes from α1 to α2 in FIG. 17), the angle of diffraction from the diffraction grating 114 also differs for each optical signal of each port (the angle of diffraction changes from β1 to β2 in FIG. 17). Here, α1 and α2 are angles with respect to Y-axis direction in FIG. 17, whereas, β1 and β2 are angles with respect to X-axis direction in FIG. 17. When the angle of diffraction from the diffraction grating 114 changes for each port, a focusing position of diffracted light on the channel micro mirror 111 is shifted for each port. Due to an effect of such shift in the focusing position, an angle of reflection of the diffracted light at the channel micro mirror 111 also differs for each port.

Consequently, when the optical fibers 112 and 113 are arranged in a straight line, due to the abovementioned reason, since it is not possible to connect the diffracted light reflected at the channel micro mirror 111 in a straight line, there occurs loss at the time of combining at the output port 112.

As a means for solving these problems, an optical fiber array having a structure in which, optical fibers in the form of an array are not arranged in a straight line, but can be arranged at arbitrary positions has been proposed. As an example of such optical fiber array, an optical fiber array in which, an optical fiber contact surface of a cover is let to be at a level corresponding to a cladding diameter of the optical fiber has been contrived (for example, refer to Patent Literature 1, Japanese Patent Application Laid-open Publication No. 2002-40284 (pages 5 and 6, FIG. 1).

An optical fiber array described in Japanese Patent Application Laid-open Publication No. 2002-40284 is shown in FIG. 15A and FIG. 15B. In an optical fiber array 122 in FIG. 15A and FIG. 15B, an angle of formation of V-grooves 106 and 107 for an optical fiber arrangement is set to be constant for all V-grooves, and moreover, a depth of the V-grooves 106 and 107 is set to differ vertically. Furthermore, a rectangular groove (recess) 119 and a rectangular projection (protrusion) 120 corresponding to the depth of the V-grooves 106 and 107 are provided on an optical fiber 121 contact surface of a cover 118. Moreover, a tape-type (tape-form) multi-fiber optical fiber bundle overlapped in a direction of thickness is disposed parallel to a horizontal direction.

Moreover, as an example of an optical fiber array used in a multi-port wavelength selector optical switch, an optical fiber array arranged in an arciform manner has been contrived (for example, refer to Patent Literature 2, FIG. 14 of U.S. Pat. No. 7,162,115(FIG. 18 of the present patent specification)). In FIG. 18, an optical fiber array 131 is arranged in an arciform manner by being pinched from an upper side and a lower side by array holding members 130a and 130b having an interval surface ground to be arc shaped. A curve of the arciform arrangement is set such that a loss of an optical signal is propagated obliquely.

Moreover, as an optical fiber array of other form, an optical fiber array which forms a V-groove having a constant angle of formation, and set at an arbitrary depth has been contrived (proposed) (for example, refer to Patent Literature 3, Japanese Patent Application Laid-open Publication No. Hei 09-5576 (pages 2 and 3, FIG. 1).

In FIG. 16, the optical fiber array disclosed in Japanese Patent Application Laid-open Publication No. Hei 09-5576 is shown. In an optical fiber array 123 in FIG. 16, a plurality of V-grooves 125 is arranged in parallel on an upper surface of a substrate 124 at a predetermined fixed interval. V-grooves 125 positioned at both sides of the plurality of V-grooves 125 are formed to have the maximum depth, and the depth of the V-grooves 125 goes on decreasing toward a center of the linear arrangement of the plurality of V-grooves 125. A projection 127 is provided at both sides of a lower surface of a cover 126, and further, a V-groove 128 is provided at an inner side of the projection 127. Closer a position of the V-groove 128 from a center of the cover 126, more is the depth of the V-groove 128. Optical fibers 129 exposed are disposed in the V-groove 125 of the substrate 124 according to the respective order of arrangement, and after applying an adhesive, all the optical fibers 129 are collectively fixed by putting the cover 126.

In this optical fiber array 123, nearer the V-groove 125 to both sides, the depth of the V-groove 125 goes on increasing progressively, and nearer the V-groove 124 to the center, the depth of the V-groove 125 goes on decreasing progressively. Therefore, as a result, a line segment which has connected fiber centers of an end surface of the optical fiber 129 is arranged to be a predetermined curve. Accordingly, the curve which has connected the fiber centers is same as the curve connecting an axis center of an optical path of an end surface of an optical transmission body which is to be connected (for example a curve connecting an axis center of the core 103 of the optical guided wave path component 100), each optical fiber 129 coincides with each optical transmission of a counterpart to which the axis center thereof is to be connected. Consequently, the connection between the optical fiber array and the optical transmission body is improved, and it is possible to reduce a joint loss.

SUMMARY OF THE INVENTION

An optical fiber array according a first aspect of the present invention includes (According to a first aspect of the present invention, there is provided an optical fiber array including)

m number of optical fibers (where, m is a natural number other than 0) arranged to be mutually parallel, an optical fiber aligning member, on a surface of which, a least m number of grooves are formed in parallel, and a cover, and an end portion of the optical fiber arranged is disposed in each groove of the optical fiber aligning member, and is held by the optical fiber aligning member and the cover, and when being held by the optical fiber aligning member and the cover, a line segment which has connected a point on an outer periphery in contact with the cover of the m number of optical fibers is set to be a straight line, and the optical fiber is supported at three points by the groove and the cover, and an angle of formation of the groove is set to be constant for all the grooves, and a depth of the groove is set arbitrarily to differ, and furthermore, a cladding diameter of the optical fiber arranged in the groove is set arbitrarily, and by making such an arrangement, a line segment which has connected a center of each of the m number of optical fibers arranged in the groove is set to be an arbitrary non straight line shape.

An optical fiber array according to a second aspect of the present invention includes m number of optical fibers (where m is a natural number other than 0) arranged at a constant pitch P1, an optical fiber aligning member, on a surface of which, at least m number of grooves are formed in parallel at a pitch narrower than the pitch P1, and a cover, and an end portion of the optical fibers arranged is disposed in each groove of the optical fiber aligning member, and is held by the optical fiber aligning member and the cover, and when being held by the optical fiber aligning member and the cover, a line segment which has connected a point on an outer periphery in contact with the cover, of the m number of optical fibers is set to be a straight line, and the optical fiber is supported at three points by the groove and the cover, and an angle of formation of the groove is set to be constant for all the grooves, and a depth of the groove is set arbitrarily to differ, and furthermore a cladding diameter of the optical fiber arranged in the groove is set arbitrarily, and by making such an arrangement, a line segment which has connected a center of each of the m number of optical fibers in the groove is set to be an arbitrary non linear shape.

Moreover, according to a preferable aspect of the present invention, it is desirable that in the optical fiber array a depth of the groove which is formed at an innermost side is set to be minimum, and a depth of the groove which is formed at the outer side is set to increase progressively toward the outer side, and the depth of the groove which is formed at an outermost side is set to be maximum, and the cladding diameter of the optical fiber arranged in the groove which is formed at the innermost side is set to be smallest, and the cladding diameter of the optical fiber arranged in the groove which is formed at the outer side is set to become larger progressively toward the outer side, and the cladding diameter of the optical fiber arranged in the groove which is formed at the outermost side is set to be largest, and by making such an arrangement, a line segment which has connected a center of each of the m number of optical fibers is set to be a predetermined curved shape.

Moreover, according to a preferable aspect of the present invention, in the optical fiber array, it is desirable that a material of the optical fiber aligning member is single-crystal silicon, and the groove is formed by an anisotropic etching.

BRIEF DESCRIPTION OF THE DRAWINGS

FIG. 8 is a plan view showing an optical fiber array according to a second embodiment of the present invention;

DETAILED DESCRIPTION OF THE INVENTION

First Embodiment

Figure 1A:
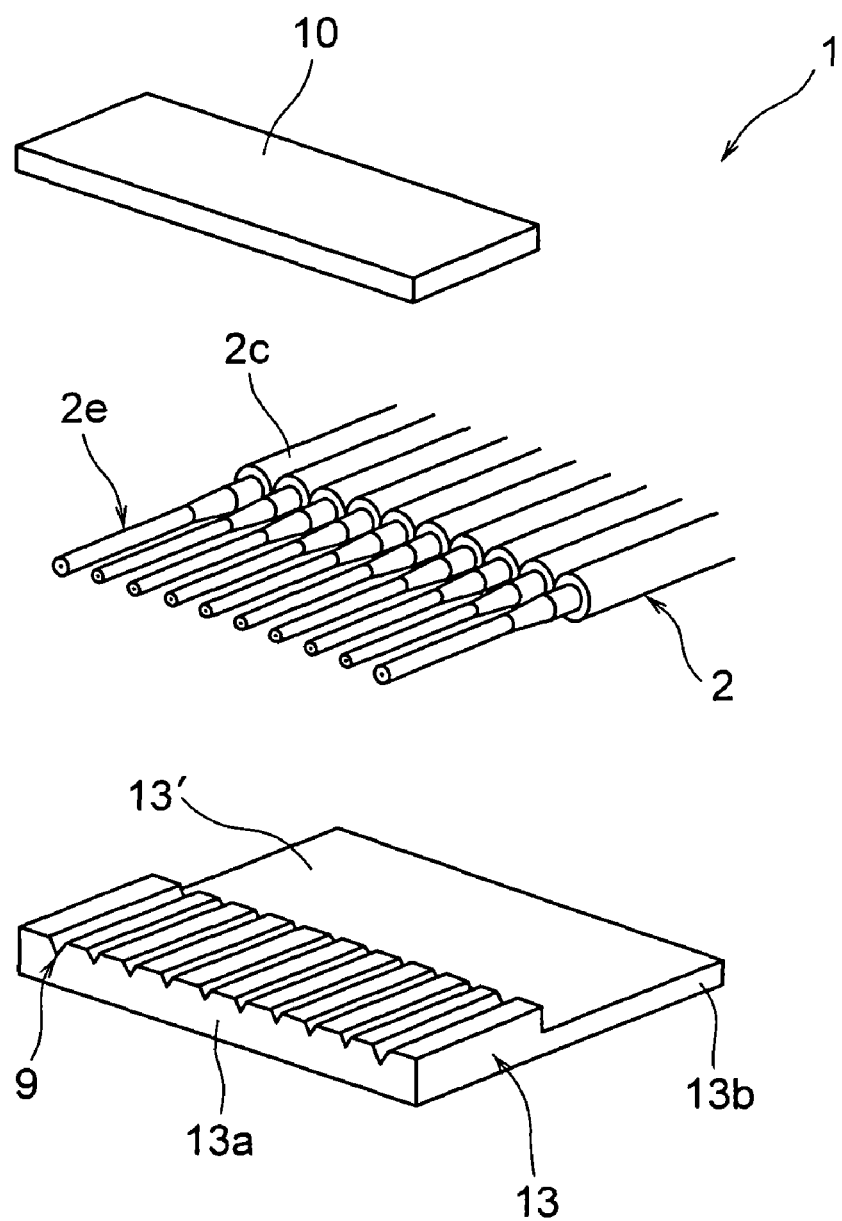
FIG. 1A is a perspective view showing a structure of an optical fiber array according to a first embodiment of the present invention.
Figure 1B:
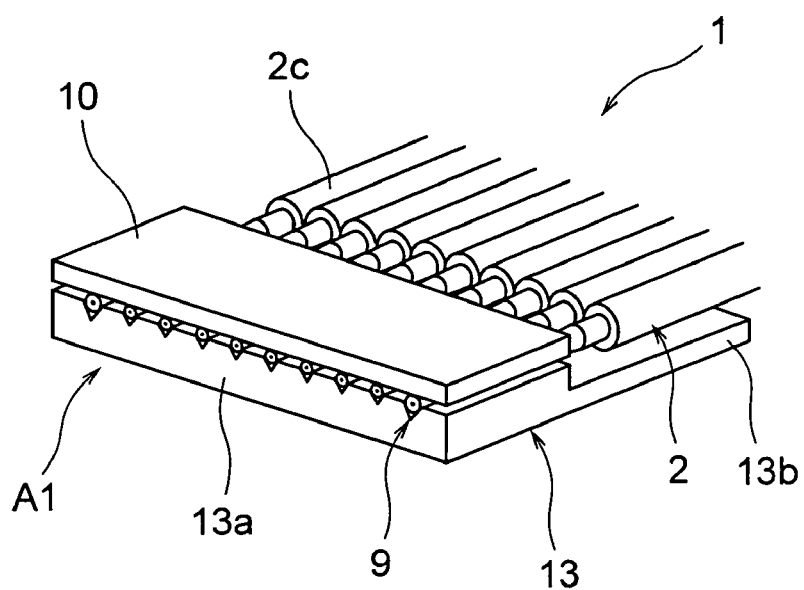
FIG. 1B is a perspective view showing an optical fiber which is formed by assembling each constituent component shown in FIG. 1A.

An optical fiber array according to the present invention will be described below while referring to diagrams from FIG. 1A to FIG. 7. As shown in FIG. 1A and FIG. 1B, an optical fiber array 1 according to the first embodiment includes a plurality of optical fibers 2 for multi-fiber propagation, a substrate 13, and a cover 10.

The optical fiber 2 includes a single-mode optical fiber in which, a core 2a (refer to FIG. 2A) is enclosed by a cladding 2b having a refractive index lower than a refractive index of the core 2a. A covering 2c at only a predetermined portion of the optical fiber 2 is peeled off, and further, a diameter of an area near an end portion of the cladding 2b is thinned to be a tapered form toward an end portion in a direction parallel to an axis c of the core 2a. An example of a means for thinning the diameter is a method such as etching, and by not letting the core 2a to be subjected to etching, only the cladding diameter is thinned while maintaining a core diameter unchanged.

The number of optical fibers 2 is to be set to a natural number other than 0, and is let to be m=10 in the first embodiment. The optical fibers 2 are arranged to be mutually parallel such that the core axes of the respective optical fibers 2 are parallel.

The substrate 13 includes an optical fiber aligning member 13a, on a surface of which, at least m number of grooves 9 having a shape of an English alphabet V (hereinafter, appropriately called as V-groove 9), and a terrace portion 13b which is formed integrally with the optical fiber aligning member 13a, and which has a flat surface 13' at a position lower than a bottom portion of the V-groove 9.

An angle of formation θ of the V-groove 9 is set to be constant for all V-grooves 9. Moreover, a depth of the V-grooves 9 is set arbitrarily to be different for all the V-grooves 9. In a structural example shown FIG. 2A and FIG. 2B, the depth of the V-groove 9 formed at the innermost side is set to be the minimum, and the depth of the V-grooves 9 which are formed at the outer side is set to increase progressively toward the outer side, and the depth of the V-groove 9 which is formed at an outermost side is set to be the maximum.

Furthermore, the cladding diameter of the optical fiber 2 to be arranged inside the V-groove 9 is set arbitrarily. In the structural example shown in FIG. 2A, in order to match with the depth of the V-groove 9, the optical fiber 2 to be arranged in the V-groove 9 formed at the innermost side is formed to be the minimum diameter, and the optical fibers 2 to be arranged in the V-groove 9 formed on the outer side are formed to be the diameter increases progressively, and the optical fiber 9 to be arranged in the V-groove 9 formed at the outermost side is set to be the maximum diameter. By setting the cladding diameter of the optical fibers 2 in such manner, at the time of holding the optical fiber 2 by the optical fiber aligning member 8 and the cover 10, a line segment which has connected a point (point H1) on an outer periphery of the m number of optical fibers 2 in contact with the cover 10 is set to be a straight line shape.

Figure 2A:
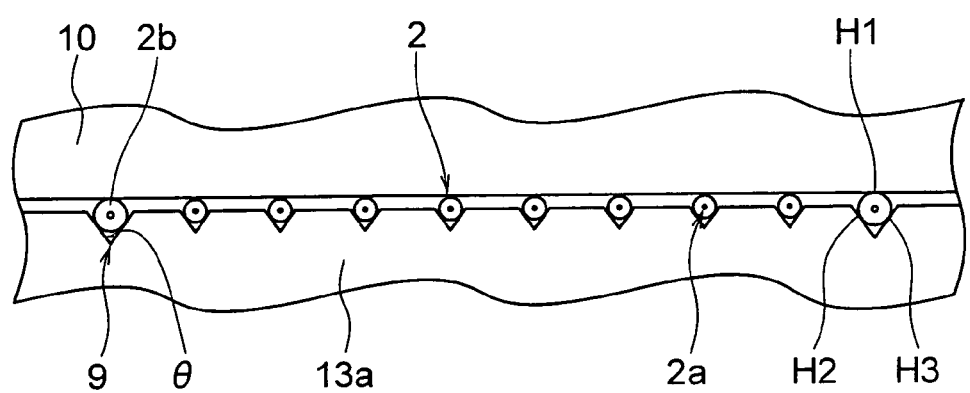
FIG. 2A is a partially enlarged view of an optical fiber end portion seen from direction A1 in FIG. 1B.
Figure 2B:
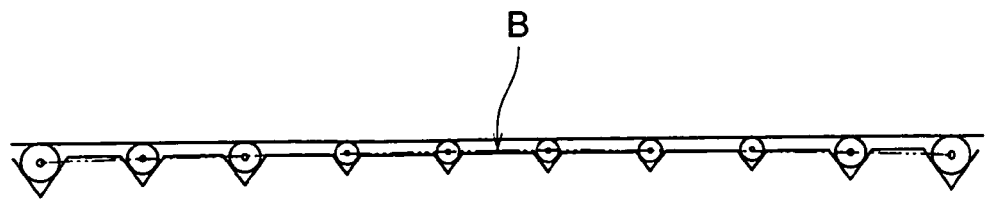
FIG. 2B is an explanatory diagram showing a state of a line segment connecting each fiber center of an optical fiber in FIG. 2A.

By such structure of the V-grooves 9 and the optical fiber 2, a line segment which has connected a fiber center of each of the m number of optical fibers 2 arranged in the V-grooves 9 is set to have an arbitrary non straight line shape as shown by an alternate long and short dashed line shown in FIG. 2B. In the first embodiment, the optical fibers 2 are arranged such that a line segment connecting the end surface of the optical fibers 2 becomes a predetermined curved shape having a constant radius of curvature.

Figure 3:
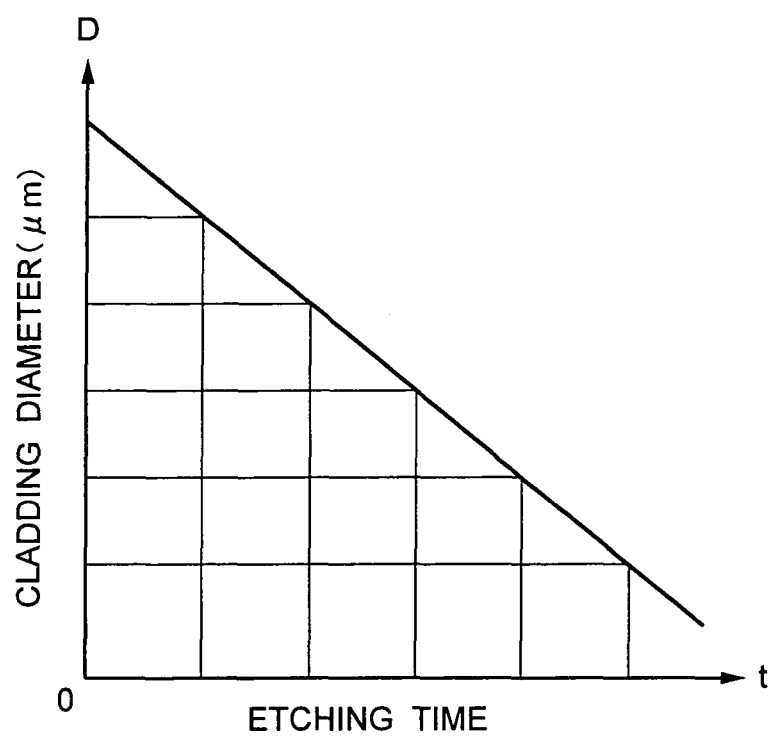
FIG. 3 is a graph showing a relationship of a cladding diameter of an optical fiber and an etching time.

The thinning of diameter of the optical fiber 2 by etching is carried out by dipping the optical fiber 2 in an etching solution. As shown in FIG. 3, since the cladding diameter D and an etching time t have almost a proportional relation, it is possible to manufacture an optical fiber having an arbitrary cladding diameter by adjusting the etching time for each optical fiber 2. An example of an etchant is an aqueous solution of a mixture of ammonium fluoride ($NH_4F$), hydrofluoric acid (HF), and demineralized water (pure water) $H_2O$, and an aqueous solution in which hydrogen peroxide solution ($H_2O_2$) is further mixed may be used. The cladding of an optical fiber portion 2e dipped in the etchant is dissolved by the etchant, and the diameter thereof is thinned gradually. There occurs a propagation loss over a lengthwise dimension in the optical fiber portion 2e which is dipped in the etchant.

Figure 4:
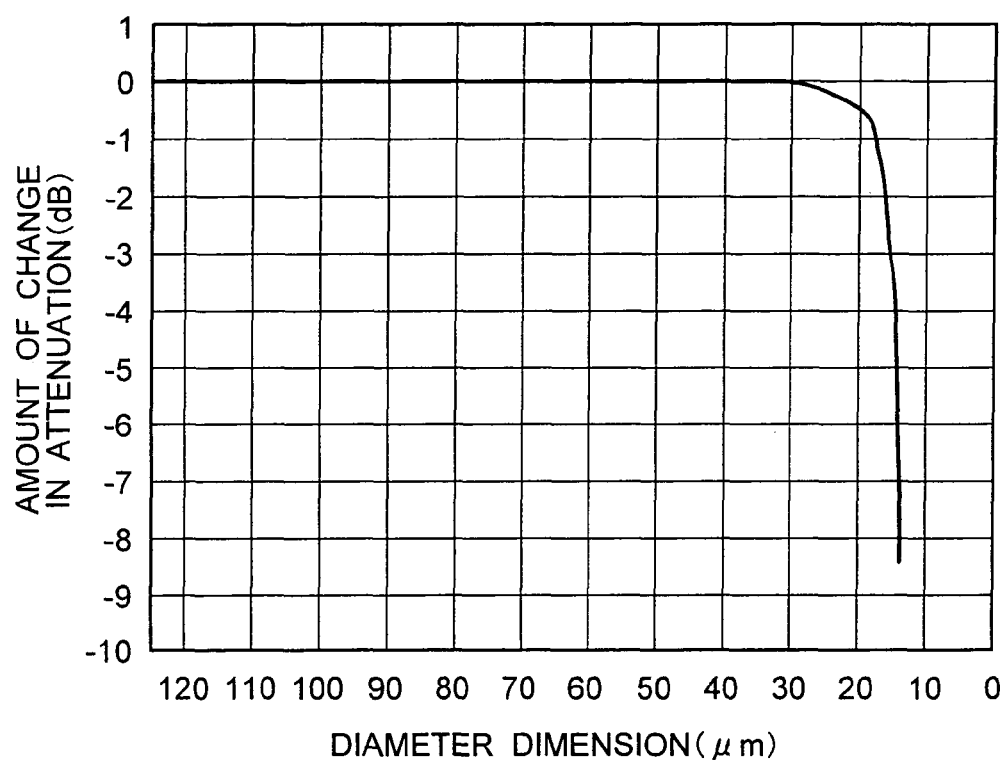
FIG. 4 is a graph of an amount of change in attenuation v/s a diameter (cladding diameter) dimension of an optical fiber which is subjected to etching.

Next, the optical fiber 2 which is subjected to etching will be described below while referring to a graph of an amount of change in attenuation v/s diameter (cladding diameter) dimension as shown in FIG. 4. A wavelength of a signal light propagated through the optical fiber 2 is let to be 1550 nm. From the graph in FIG. 4, it is revealed that an attenuation value of a propagation power of a signal light is maintained to be constant till the diameter dimension decreases below approximately 30 μm, and as the diameter dimension decreases below approximately 30 μm, a change begins to appear. Consequently, since it is evident that the diameter dimension of approximately 30 μm can be considered to be a propagation critical point, the cladding diameter is set to be minimum 30 μm.

Figure 6A:
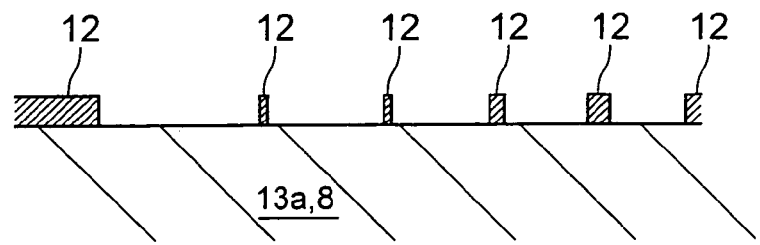
FIG. 6 are explanatory diagrams showing a manufacturing process of an optical fiber aligning member of the optical fiber array in FIG. 1A, FIG. 1B, or FIG. 8.

Next, a manufacturing process for manufacturing the V-grooves 9 on the surface of the optical fiber aligning member 13a will be described below while referring to diagrams from FIG. 6A to FIG. 6E. In FIG. 6A to FIG. 6E, only a left-side half of the optical fiber aligning member 13a in FIG. 1A and FIG. 1B is shown. Single-crystal silicon (Si) is used as a material of the optical fiber aligning member 13a (hereinafter, appropriately called as 'silicon member 13a'). Masks 12 are covered parallel to a direction (110) on a plane of a direction of the silicon member 13a as shown in FIG. 6A.

Figure 6B:
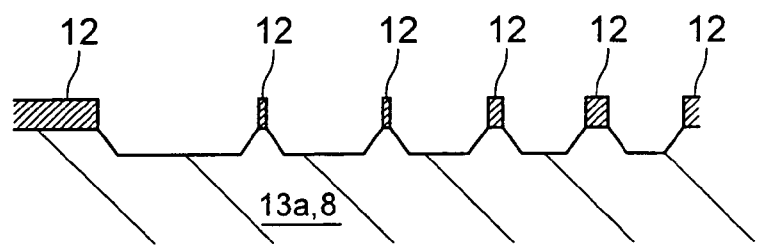

Next, in a state of the masks 12 manufactured by a photolithography process covered, the silicon member 13a is dipped in an etchant not shown in the diagram. As an etchant, potassium hydroxide (KOH) or tetramethyl ammonium hydroxide (TMAH) is used. Etching holes corresponding to an anisotropic shaft of the silicon member 13a are formed in the mask 12, and anisotropic etching of a surface (111) of the silicon member 13a dipped in the etchant is started by the etchant which enters through the etching holes, at a portion equivalent to each etching hole as shown in FIG. 6B. In other words, an etching groove in the form having a shape of an English alphabet V defined by the surface (111) is formed.

Figure 6C:
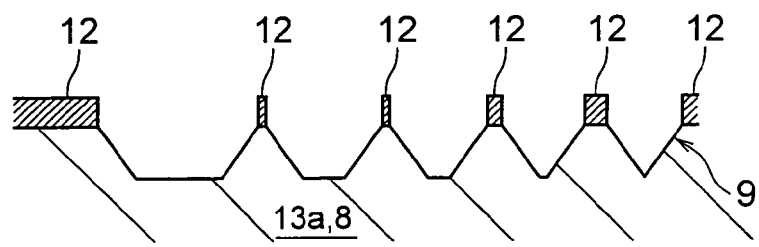

Since an etching speed ratio in (111) direction and (100) direction differ substantially, the anisotropic etching as shown in FIG. 6B and FIG. 6C advances along an inclined surface which is inclined at a predetermined angle with respect to the surface of the silicon member 13a. By this advancement of the etching reaching an apex formed at the inclined surface, the V-groove 9 is formed. Moreover, the depth of the V-groove 9 is set to a predetermined depth by setting a size of the etching hole to a desired size. Consequently, as shown in FIG. 2A, the V-groove to be formed at the innermost side (the V-groove 9 to extreme right in diagrams from FIG. 6A to FIG. 6E) is formed first, and when the etching of the V-groove 9 at the innermost side has reached the apex, the other V-grooves 9 have not yet reached the top (apex) as shown in FIG. 6C.

Figure 6D:
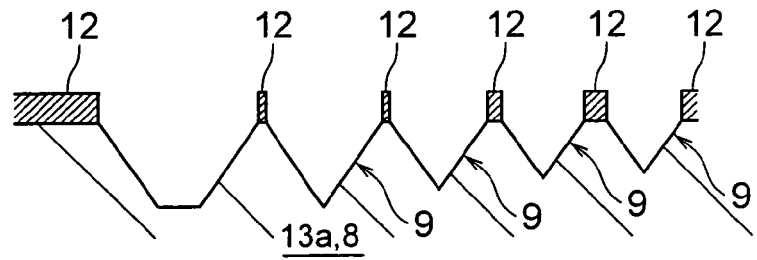
Figure 6E:
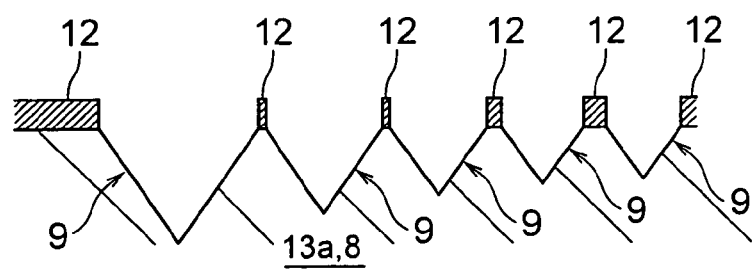

By the anisotropic etching advancing further, the V-grooves 9 are formed by reaching the apex in order of starting from the V-groove 9 to be formed at an inner side as shown in FIG. 6D. By forming the V-grooves 9 by the anisotropic etching, it is possible to form easily the V-grooves having a constant angle of formation and a different arbitrary depth.

Next, according to FIG. 1A, FIG. 1B, FIG. 2A, and FIG. 2B, the optical fiber aligning member 13 and the cover 10 for the optical fiber aligning member are disposed to pinch an end portion of the optical fiber 2 from an upper side and a lower side. A partially enlarged view of the optical fiber end portion seen from a direction of arrow A1 in FIG. 1B is shown in FIG. 2A. One optical fiber 2 each is disposed in each V-groove 9 such that the optical fiber 2 is held from the upper side and the lower side by a surface of the cover 10 and one V-groove 9. Accordingly, the m number of fiber portions 2e of which the diameter is thinned, are arranged in each V-groove 9. Each optical fiber 2 by being held by the optical fiber aligning member 13a and the cover 10, is supported by three contact points H1 to H3 of the surface of the cover 10 and each V-groove 9.

By filling an adhesive in a gap between the V-groove 9 and the optical fiber 2, and in a space between the optical fiber aligning member 13a and the cover 10, the optical fiber 2, and the optical fiber aligning member 13a and the cover 10 are fixed. Furthermore, the end portion of the optical fiber 2 is ground together with the optical fiber aligning member 13a and the cover 10, and a length of the end portion of each optical fiber 2 is adjusted to be uniform. Or, the length of the end portions of the m number of optical fibers 2 may be adjusted to be uniform by grinding only the end portion of the optical fiber 2 to be flat.

Figure 7:
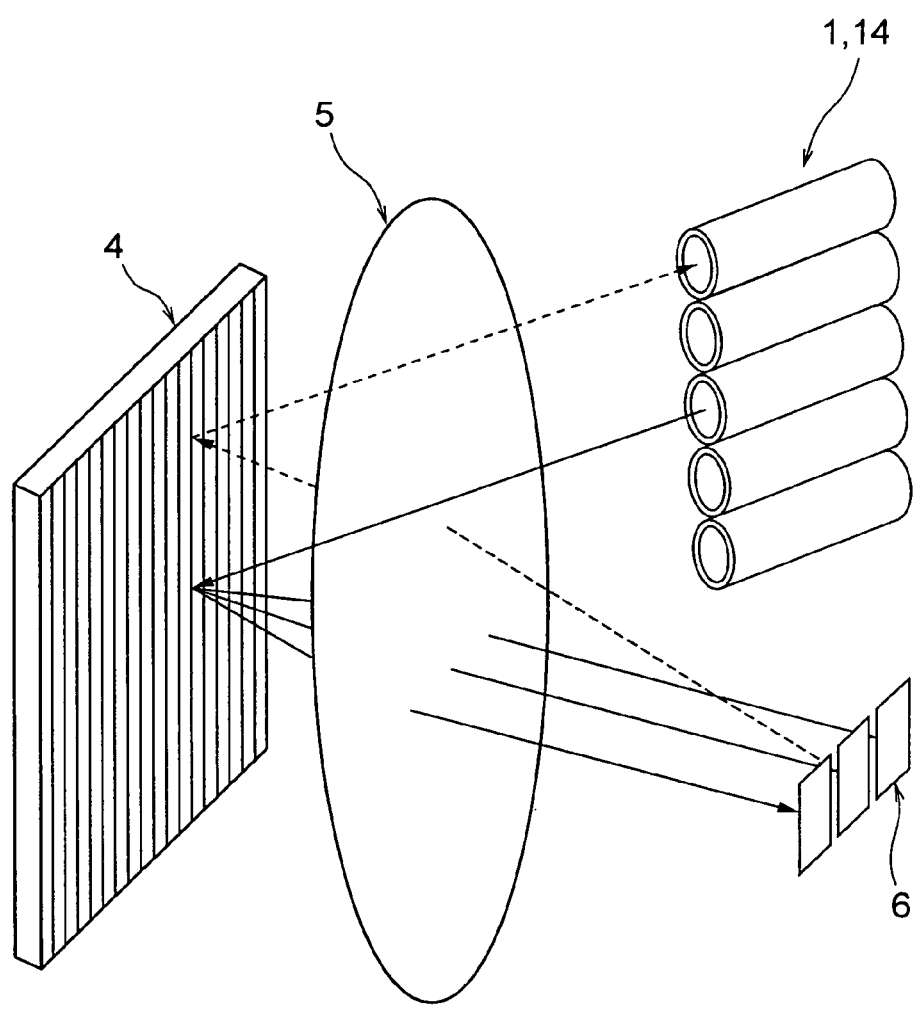
FIG. 7 is a conceptual diagram showing a structure of an example of an application in which the optical fiber array in FIG. 1A, FIG. 1B.

Next, an example of an application in which the optical fiber array 1 is used will be described below by referring to FIG. 7. FIG. 7 is a conceptual diagram showing a structure of an optical demultiplexer in which the optical fiber array 1 is used, and for an optical fiber array forming an input-output port, the optical fiber array 1 according to the first embodiment is used. An end portion of the optical fiber array 1 shown in FIG. 2A is disposed to be directed toward a diffraction grating 4.

One port of the optical fiber array 1 is let to be an input port, and a wavelength multiplexed signal is emerged from the input port to the diffraction grating 4, and the wavelength multiplex signal is diffracted for each wavelength. For an angle of diffraction of diffracted light to be an angle corresponding to a wavelength, after the diffracted light has passed through a lens 5, the diffracted light is reflected at an MEMS mirror array 6 according to the wavelength, and is combined at each output port of the optical fiber array 1.

The light coupled at the output port of the optical fiber array 1 is coupled optically in each optical fiber 2, and is propagated.

In the optical demultiplexer in FIG. 7, even when the diffracted light assumes a non straight line form by an optical signal of each input port emerged from the optical fiber array 1 being incident at a different angle on the diffraction grating 4, by adjusting the depth of the V-groove 9 and the cladding diameter of the optical fiber 2 such that a curve B shown by alternate long and short dashed line in FIG. 2B coincides with the non straight line form of the diffracted light, it is possible to reduce a joint loss of the diffracted light and the output port.

In such manner, in the optical fiber array 1 according to the present invention, it is possible to arrange arbitrarily the plurality of optical fibers 2 in the form of an array by adjusting the depth of the V-groove 9 and the cladding diameter of the optical fiber 2 according to an optical coupling system.

Moreover, since the m number of optical fibers 2 are held by three points namely two points (H2 and H3) of the V-groove 9 of the optical fiber aligning member 13a and one point H1 on the surface of the cover 10, it is possible to realize the optical fiber array 1 in which it is possible to position the optical fibers 2 accurately.

Furthermore, by setting the line segment which connects the point H1 at an outer periphery in contact with the cover 10, of the m number of optical fibers 2 to be a straight line, it is possible to hold the optical fiber 2 by the cover 10 having a shape of a flat plate. Consequently, the positioning of the cover 10 with respect to the V-groove 9 is simplified, and a manufacturing time of the cover 10 is also shortened.

Figure 13:
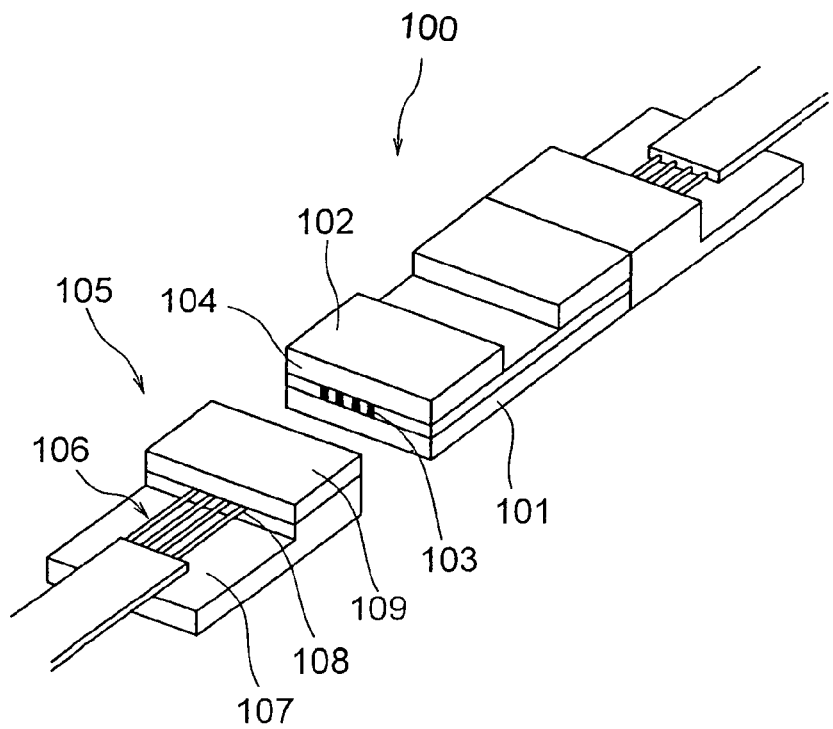
FIG. 13 is a perspective view explaining a state of connection of an optical guided wave path component and an optical fiber array.
Figure 14:
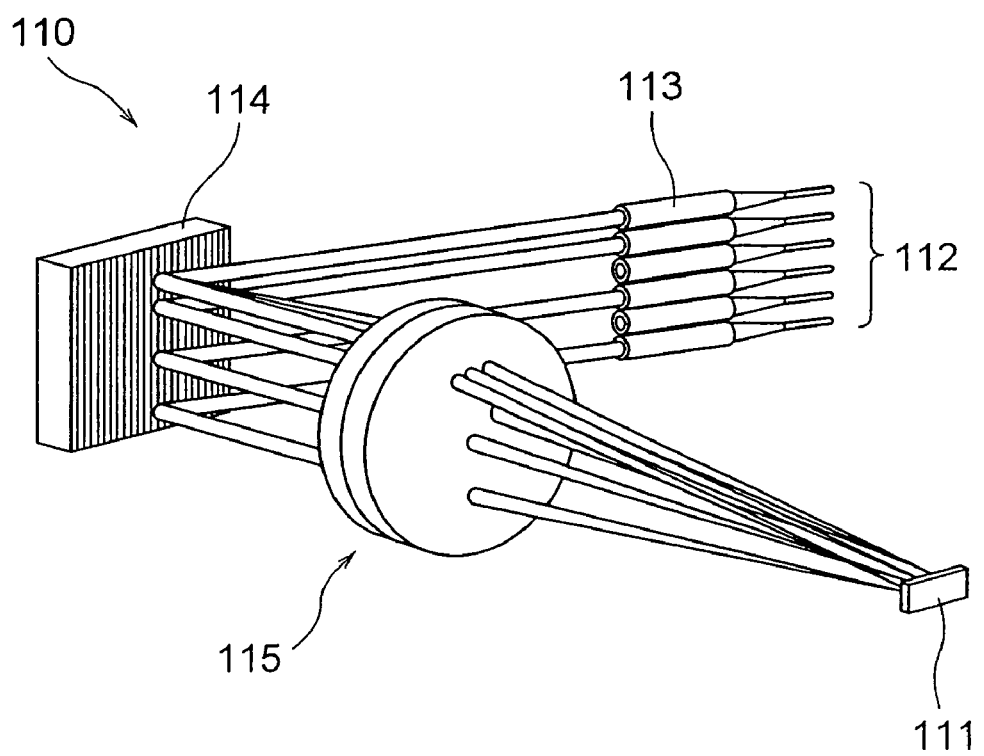
FIG. 14 is a perspective view showing a structure of an optical demultiplexer.
Figure 15A:
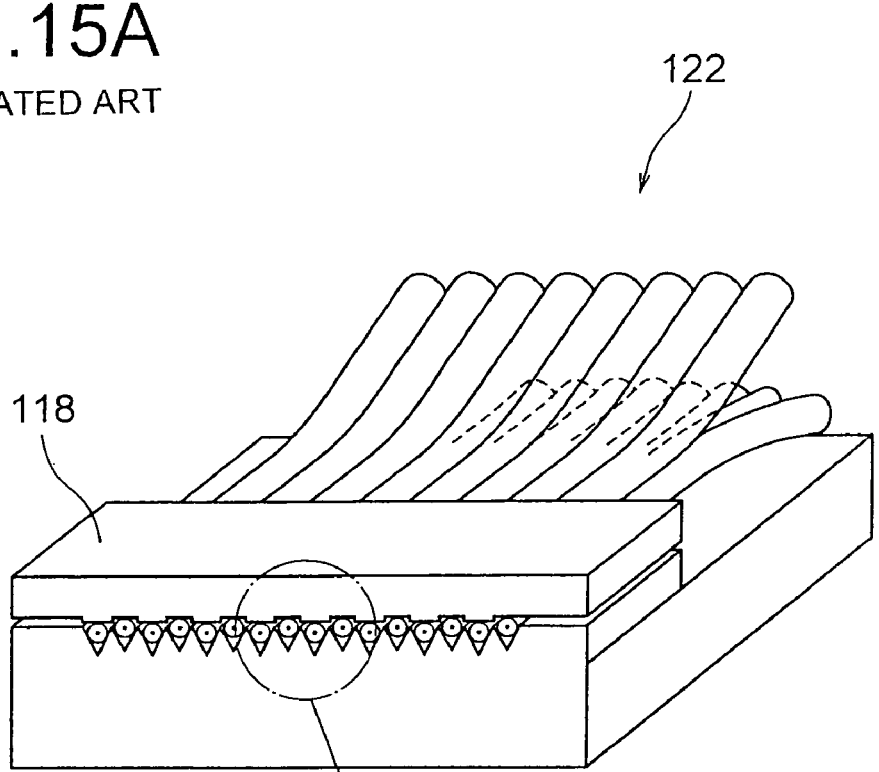
FIG. 15A is a perspective view showing an example of a conventional optical fiber array.
Figure 15B:
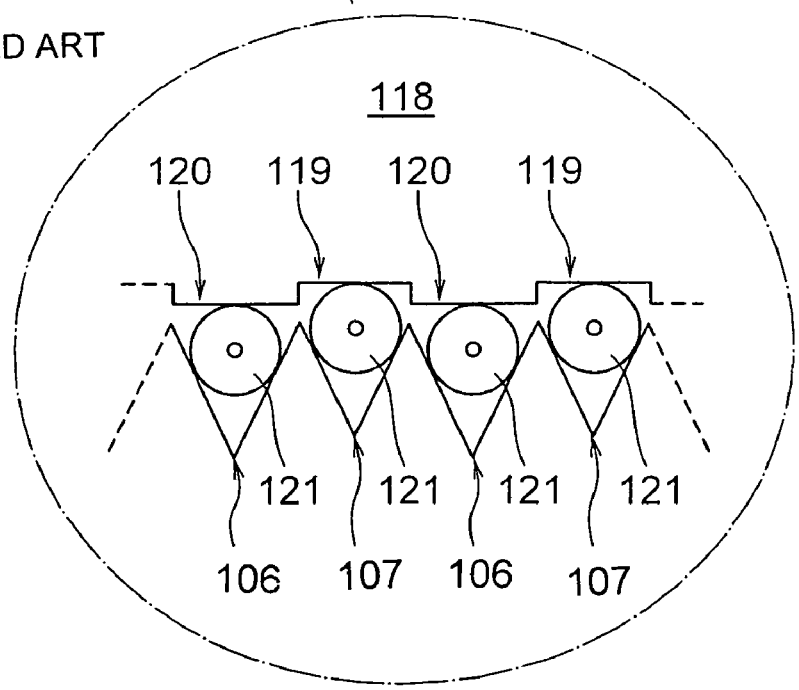
FIG. 15B is a partially enlarged view of an elliptical portion shown by an alternate long and short dashed line in FIG. 15A.
Figure 16:
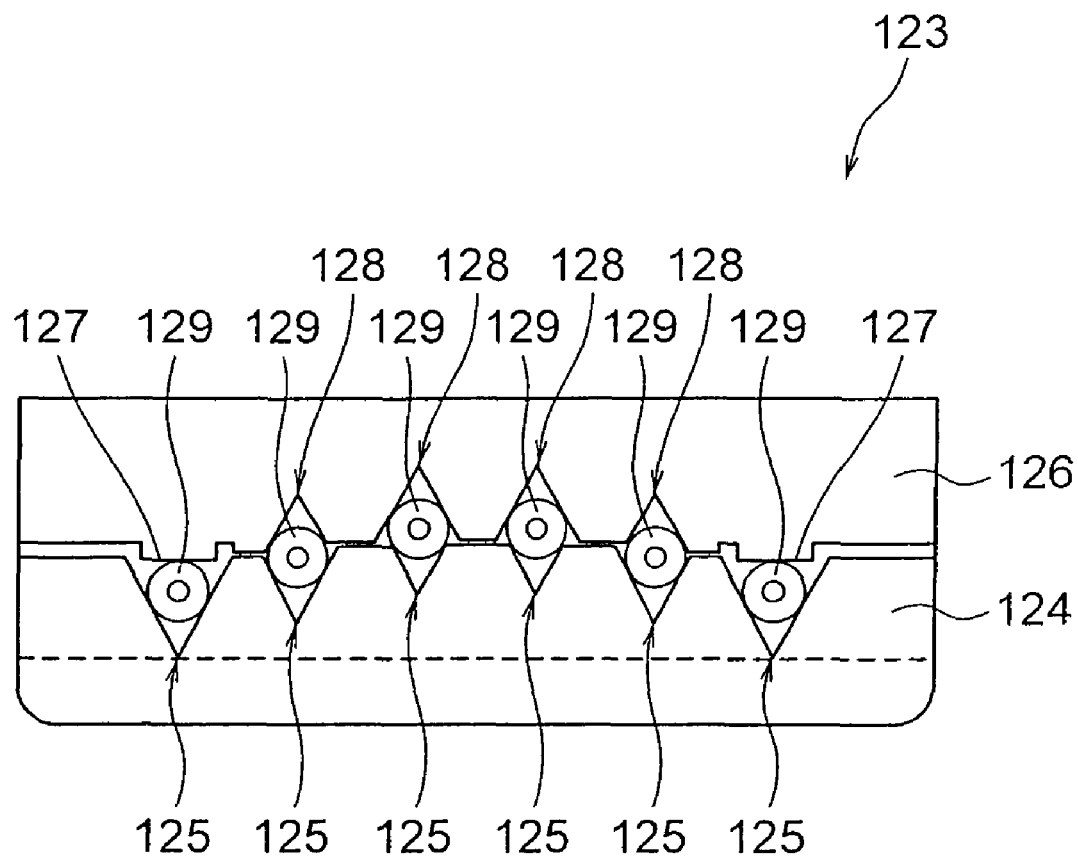
FIG. 16 is a plan view showing an example of another conventional optical fiber array.
Figure 17:
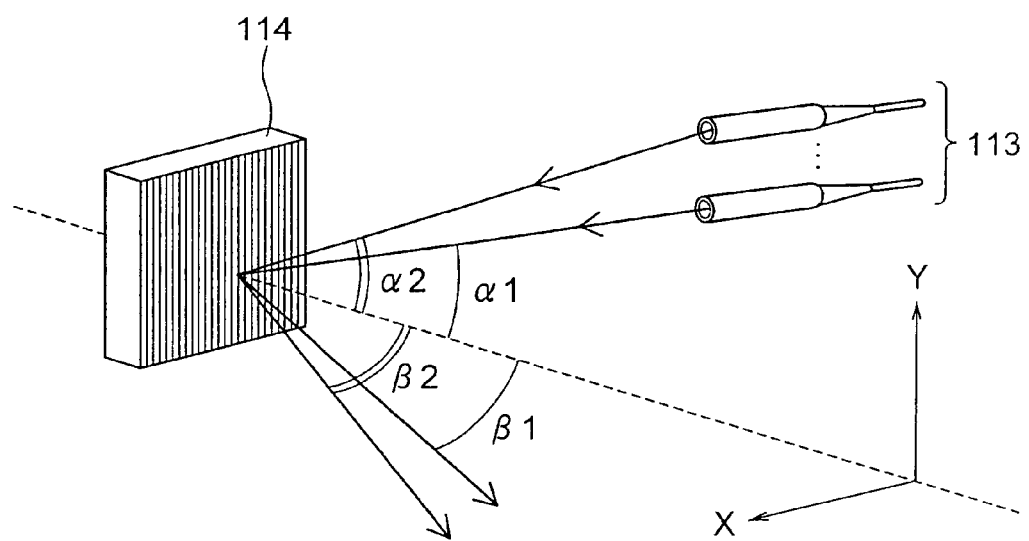
FIG. 17 is a perspective view showing schematically a state of propagation of an optical signal when a plurality of input ports is provided in an optical demultiplexer.
Figure 18:
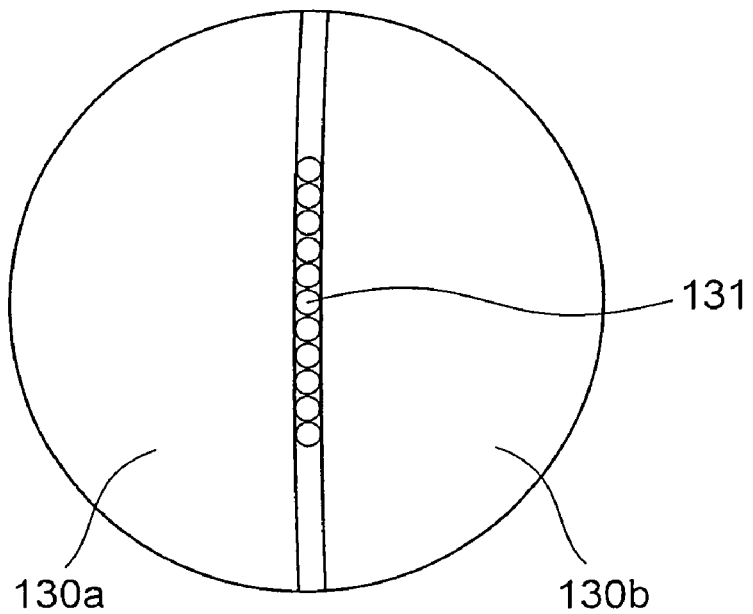
FIG. 18 is a partially enlarged view showing an example of an optical fiber array of still another conventional optical fiber array.

As an application in which the optical fiber array 1 is used, apart from the optical demultiplexer described by referring to FIG. 7, an optical fiber array 1 according to the first embodiment may be used as an optical fiber array 105 which is (to be) connected optically to an optical guided wave path component 100 as shown in FIG. 13.

Second Embodiment

Figure 8:
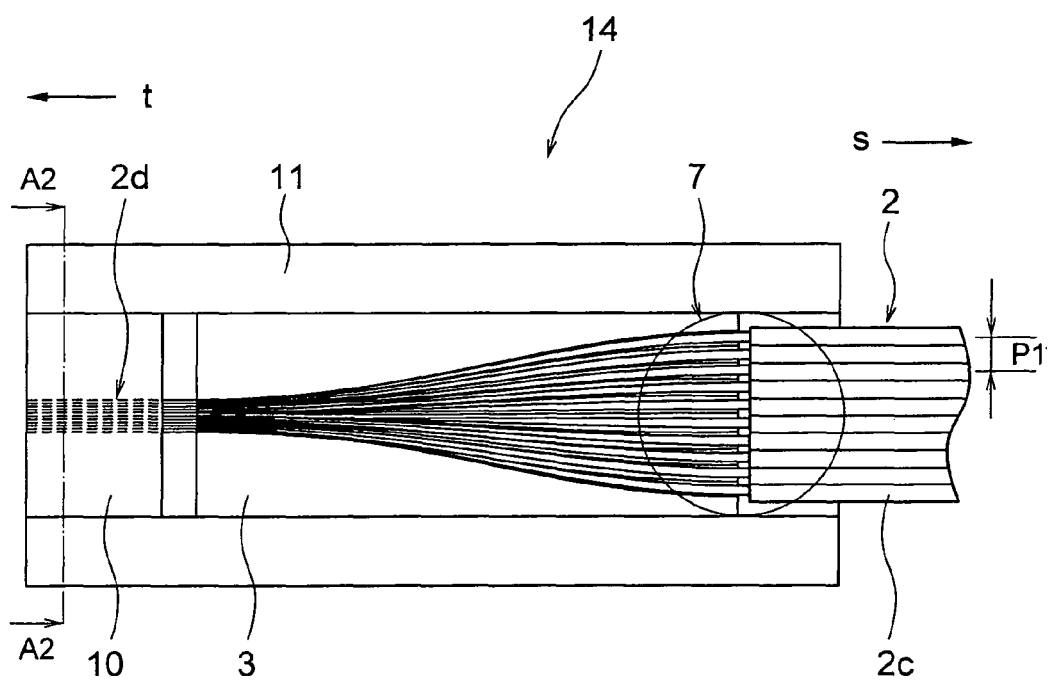
FIG. 8 is used.

Next, a second embodiment of an optical fiber array according to the present invention will be described below while referring to diagrams from FIG. 8 to FIG. 10B. Same reference numerals are assigned to components which are same as in the optical fiber array 1 of the first embodiment, and the description of such components is either omitted or made in brief. As shown in FIG. 8, an optical fiber array 14 of the second embodiment includes the plurality of optical fibers 2 for multi-fiber propagation, a substrate 3 provided with a guide (hereinafter, 'guide substrate 3'), an optical fiber aligning member 8 on a surface of which, a plurality of grooves is formed (refer to FIG. 10A and FIG. 10B), the cover 10 which covers the optical fiber aligning member 8, and a holder 11 which holds the guide substrate 3.

Figure 5:
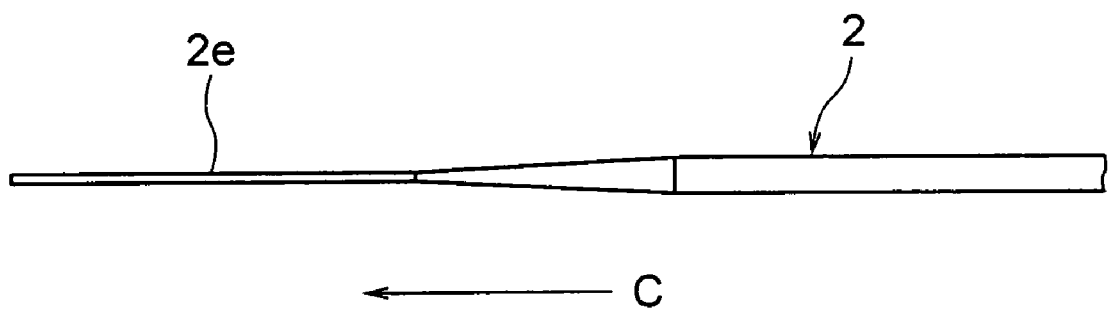
FIG. 5 is a partially enlarged view of an optical fiber used in the optical fiber array in FIG. 1A, FIG. 1B, or FIG. 8.

A portion of a predetermined dimension of the covering 2c from a starting-end side (side of an arrow s in FIG. 8 and FIG. 9) toward an end portion (side of an arrow t in FIG. 8 and FIG. 9) of the optical fiber 2 is peeled off, and further, a diameter of an area near an end portion of the cladding 2b excluding the covering 2c is thinned to be tapered form by etching, as shown in FIG. 5.

Since a core distance of non-etching locations (including the portion of the covering 2c) of each optical fiber 2 is 250 µm, the optical fibers 2 at the starting-end side are arranged uniformly at a constant pitch P1=250 µm.

Figure 9:
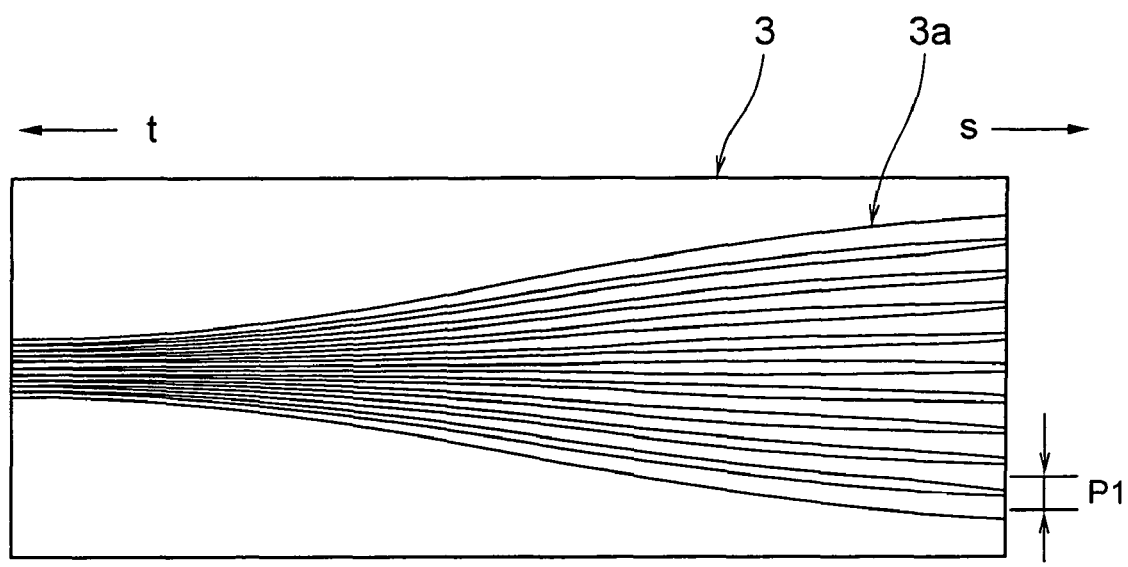
FIG. 9 is a plan view showing a guide substrate which is a constituent component of the optical fiber array in FIG. 8.

The guide substrate 3 is made of silicon (Si) having a melting point higher than 230° C., or plastic having a glass transition temperature higher than 230° C., or photosensitive glass having the same glass transition temperature higher than 230° C. Furthermore, a guide which includes the m number of optical fibers 2 and the same number of m number of grooves 3a is formed on the surface of the guide substrate 3 as shown in FIG. 9. The grooves 3a are formed in parallel at a constant pitch P1 at one end side of the guide substrate 3 (the side of arrow s), and toward an end portion side (the side of arrow t) which is in an opposite direction of the one-end side, the grooves 3a are formed such that the pitch P1 is narrowed progressively.

The optical fiber 2 is inserted in each groove 3a of the guide substrate 3 as shown in FIG. 8, and each optical fiber 2 is held firmly by putting a holding member 7 from a top of the guide substrate 3 in a state of the optical fibers 2 inserted into the grooves 3a (in FIG. 8, for ensuring visibility, the pressing member 7 is drawn to be transparent). Next, by fixing by pouring an ultraviolet curing resin adhesive, optical fibers in the form of an array including ten optical fibers 2 is formed.

A reason for using an ultraviolet curing resin adhesive for fixing the optical fibers 2 is that, the time required for fixing (task time) by an ultraviolet curing resin adhesive as compared to the time required for fixing by other adhesive such as heat curing adhesive is only ultraviolet rays irradiation time, and it is possible to complete the process in short time. An ultraviolet curing resin adhesive of an epoxy base, or an acryl base, or a silicon base having a glass transition temperature in a range of 60° C. to 150° C. is to be used.

As it has been described above, the grooves 3a are formed such that the pitch P1 is narrowed progressively toward the end portion side (side of arrow t) of the guide substrate 3. Consequently, the optical fibers 2 inserted into the grooves 3a respectively are also arranged at pitch P1 at the one-end side (side of the arrow s), and the pitch P1 is narrowed progressing toward the end portion (side of the arrow t) of the optical fiber 2. Accordingly, distance between (pitch of) the cores 2a of the optical fibers 2 at the end-portion side becomes narrower than the pitch P1, progressively as approaching toward the end portion of the side of arrow t. Moreover, as shown in FIG. 10B, the end portions of the optical fibers 2d are arranged to be converged in the form of a row at a pitch P2 to P6 narrower than the pitch P1, and form a converged portion 2d.

Since the guide is formed to narrow progressively, each optical fiber 2 is curved inside the groove 3a. Consequently, a curved shape of the guide is determined upon taking into consideration a propagation loss which occurs with the bending of the optical fiber 2.

Figure 10A:
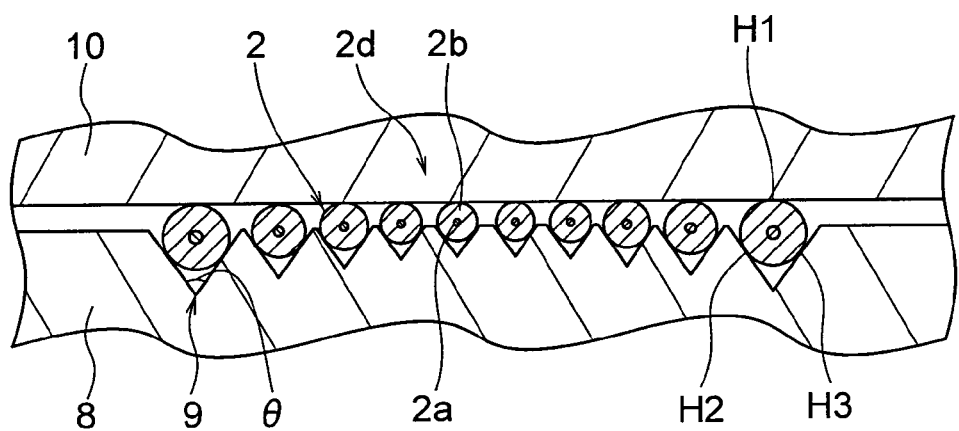
FIG. 10A is an A2-A2 enlarged portion cross-sectional view of FIG. 8.
Figure 10B:
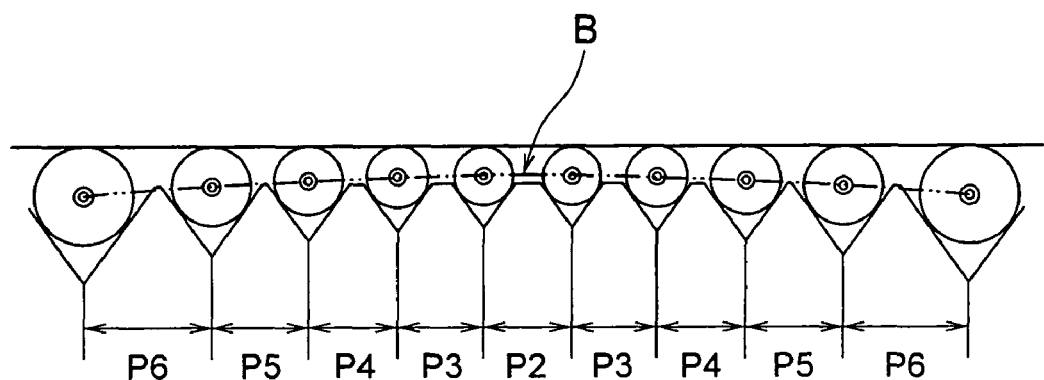
FIG. 10B is an explanatory diagram showing a state of a line segment connecting each fiber center of the optical fiber in FIG. 10A.

Next, as shown in FIG. 8, and FIG. 10A and FIG. 10B, the optical fiber aligning member 8 and the cover 10 for the optical fiber aligning member 8 are installed to hold the converged portion 2d of the end portion of the optical fiber 2 from the upper side and the lower side. An enlarged view of a cross-section shown by a line A2-A2 of FIG. 8 is shown in FIG. 10A. At least m number of grooves 9 which is same as the number of optical fibers 2 are formed in parallel at a pitch ranging from P2 to P6 which is narrower than the pitch P1 on the surface of the optical fiber aligning member 8, and one optical fiber 2 each is arranged in each groove 9 to be held from the upper side and the lower side by the surface of the cover 10 and one groove 9. Accordingly, the m number of optical fiber portions 2e having the diameter thinned are arranged in the respective grooves 9. Since a cross-sectional shape of each groove 9 is formed to have a shape of an English alphabet V as shown in FIG. 10A and FIG. 10B (hereinafter, indicated by 'V-groove 9'), by all the optical fibers of the converged portion 2d being pinched by the optical fiber aligning member 8 and the cover 10, the optical fibers 2 are supported by three contact points H1, H2, and H3 of each V-groove 9 and the surface of the cover 10.

An angle of formation θ of the V-groove 9 is set to be constant for all the V-grooves 9. Furthermore, the depth of the V-grooves 9 is set arbitrarily to be different. In a structural example shown in FIG. 10A and FIG. 10B, the depth of the V-groove 9 formed at the innermost side is set to be the minimum, and the depth of the V-grooves 9 to be formed at an outer side, namely, disposed at both sides, is formed to be deeper progressively, and the depth of the V-groove 9 formed at the outermost side is set to be the maximum.

Furthermore, the cladding diameter of the optical fibers 2 to be arranged in the V-grooves 9 is set arbitrarily. In a structural example shown in FIG. 10A and FIG. 10B, to match with the depth of the V-groove 9, the optical fiber 2 to be arranged in the V-groove 9 formed at the innermost side is set to be the thinnest, the optical fibers 2 to be arranged in the V-groove 9 formed at the outer side become thicker progressively toward the outer side, and the optical fiber 2 to be arranged in the V-groove 9 formed at the outermost side is set to be the thickest. By setting the cladding diameter of the optical fibers 2 in such manner, at the time of holding by the optical fiber aligning member 8 and the cover 10, a line segment which has joined a point (point H1) of an outer periphery of the m number of optical fibers 2d in contact with the cover 10 is set to be in a straight line shape.

By such an arrangement of the V-grooves 9 and the optical fibers 2, a line segment which has joined the fiber centers of the m number of optical fibers 2 arranged in the V-groove 9 is set to an arbitrary non straight line shape as shown by an alternate long and short dashed line in FIG. 10B. As a result, the optical fibers 2 are arranged such that the line segment which joins the fiber center of the end surface of the optical fiber 2 becomes a predetermined curved shape having a constant radius of curvature.

Next, an adhesive is filled in the gap between the V-groove 9 and the optical fiber 2, and in a space between the optical fiber aligning member 8 and the cover 10. Furthermore, the end portion of the optical fiber 2 is ground together with the optical fiber aligning member 8 and the cover 10, and the length of the end portion of each optical fiber 2 is adjusted to be uniform. Or, the length of the end portions of the m number of optical fibers 2 may be adjusted to be uniform by grinding only the end portion of the optical fiber 2 to be flat.

A manufacturing process for manufacturing the V-grooves 9 on the surface of the optical fiber aligning member 8 is as shown in FIG. 6A to FIG. 6E described above.

An example of an application in which the optical fiber array 14 is used is a case in which the optical fiber array 14 according to the second embodiment is used as an optical fiber array which forms an input-output port of the optical demultiplexer shown in FIG. 7 described above. An end portion of the optical fiber array 14 shown in FIG. 8 is arranged to be directed toward the diffraction grating 4. Moreover, apart from using in the optical demultiplexer, the optical fiber array 14 according to the second embodiment may used as the optical fiber array 105 which is connected optically to the optical guided wave path component 100 as shown in FIG. 13.

Figure 11A:
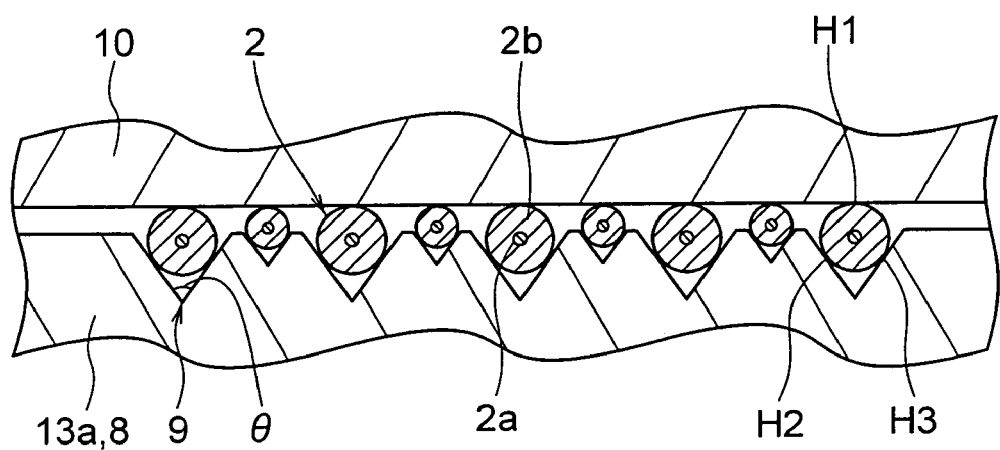
FIG. 11A is a partially enlarged view showing a structure of an optical fiber end surface according to a modified example of the optical fiber array according to the present invention.
Figure 11B:
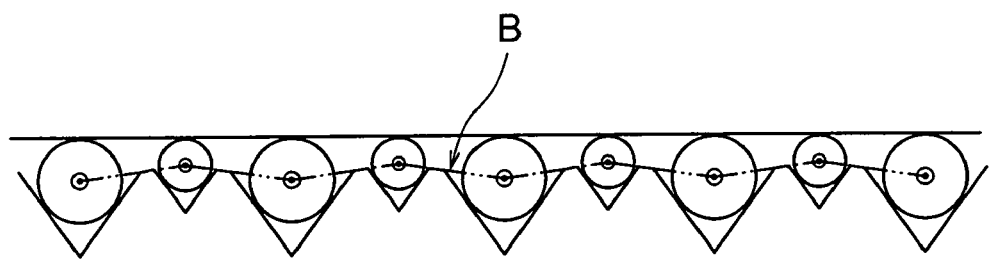
FIG. 11B is an explanatory diagram showing a state of a line segment connecting each fiber center of the optical fiber in FIG. 11A.
Figure 12:
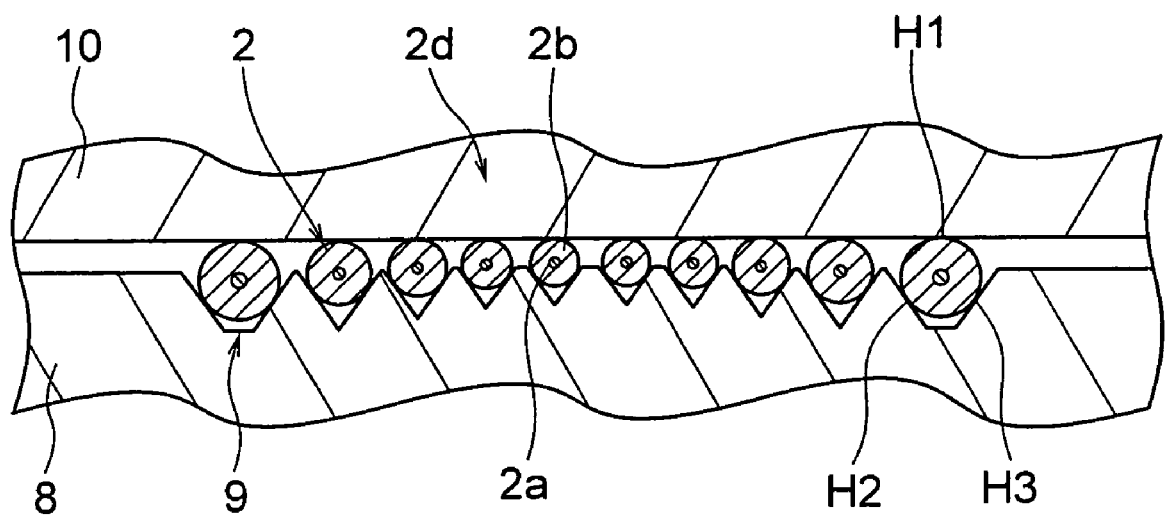
FIG. 12 is an enlarged portion cross-sectional view showing a modified example of a groove shape of an optical fiber aligning member.

Various modifications according to technological ideas are possible in the present invention. For instance, a structure of the end surface of the optical fiber 2 in the optical fiber array 1 or 14 may be modified to a structure as shown in FIG. 11A and FIG. 11B, instead of the structure shown in FIG. 2A and FIG. 2B, or FIG. 10A and FIG. 10B. The structure of the end surface of the optical fiber 2 in FIG. 11A and 11B is a structure in which, the optical fibers 2 of two types, one type having a small cladding diameter, and the other type having a large cladding diameter are arranged alternately in the V-grooves 9 of different depths. Consequently, the line segment which has joined the fiber centers of the m number (m=9) of optical fibers 2 is set to be in a form of a broken line which is a not in the form of a straight line as shown by an alternate long and short dashed line B shown in FIG. 11B.

Moreover, a shape of the line segment which has joined the fiber centers of the m number of optical fibers 2 may be set to be other aspheric curve.

Moreover, the V-groove 9 may be formed up to an apex, provided that the V-groove 9 does not hinder the arrangement of the optical fibers 2. Furthermore, it is also possible to use a tape-type optical fiber for (as) the optical fiber 2.

According to the optical fiber arrays described above, it is possible to arrange arbitrarily the plurality of optical fibers in the form of an array by adjusting the depth of the groove and the cladding diameter of the optical fiber according to an optical coupling system of an application.

Moreover, since the m number of optical fibers are held by three points namely two points of the groove of the optical fiber aligning member and one point on the surface of the cover, it is possible to realize the optical fiber array 1 in which an accurate positioning of the optical fibers is possible.

Furthermore, by setting the line segment which connects the point at the outer periphery in contact with the cover, of the m number of optical fibers to be a straight line, it is possible to hold the optical fiber by the cover having a shape of a flat plate. Consequently, the positioning of the cover with respect to the groove is simplified, and the manufacturing time of the cover is also shortened.

Moreover, by forming the grooves by the anisotropic etching, it is possible to manufacture easily the grooves having the constant angle of formation and different depth.

The optical fiber array according to the present invention can be used in a wiring portion of an optical communication system, and in an optical demultiplexer.

What is claimed is:

1. An optical fiber array comprising:
   m number of optical fibers (where, m is a natural number which is 3 or more) arranged to be mutually parallel;
   an optical fiber aligning member, on a surface of which, at least m number of grooves are formed in parallel; and
   a cover, wherein
   an end portion of the optical fibers arranged is disposed in each groove of the optical fiber aligning member, and is held by the optical fiber aligning member and the cover, and when being held by the optical fiber aligning member and the cover a line segment which has connected a point on an outer periphery in contact with the cover, of the m number of optical fibers is set to be a straight line, and the optical fiber is supported at three points by the groove and the cover, and
   an angle of formation of the groove is set to be constant for all the grooves, and a depth of the groove is set arbitrarily to differ, and furthermore
   a cladding diameter of the optical fiber arranged in the groove is set arbitrarily, and
   by making such an arrangement, a line segment which has connected a center of each of the m number of optical fibers in the groove is set to be an arbitrary non straight line shape.

2. An optical fiber array comprising:
   m number of optical fibers (where m is a natural number which is 3 or more) arranged at a constant pitch P1;
   an optical fiber aligning member, on a surface of which, at least m number of grooves are formed in parallel at a pitch narrower than the pitch Pl; and
   a cover, wherein
   the pitch of the optical fibers is narrowed progressively toward an end portion of the arrangement of the optical fibers, and at the end portion of the arrangement of the optical fibers the optical fibers are arranged at a pitch narrower than the pitch P1, and an end portion of the optical fibers arranged is disposed in each groove of the optical fiber aligning member, and is held by the optical fiber aligning member and the cover, and when being held by the optical fiber aligning member and the cover, a line segment which has connected a point on an outer periphery in contact with the cover of the m number of optical fibers is set to be a straight line, and the optical fiber is supported at three points by the groove and the cover, and an angle of formation of the groove is set to be constant for all the grooves, and a depth of the groove is set arbitrarily to differ, and furthermore a cladding diameter of the optical fiber arranged in the groove is set arbitrarily, and by making such an arrangement, a line segment which has connected a center of each of m number of optical fibers arranged in the groove is set to be an arbitrary shape which is non linear.

3. The optical fiber array according to one of claims 1 and 2, wherein a depth of the groove which is formed at an innermost side is set to be minimum, and a depth of the grooves which are formed at the outer side is set to increase progressively toward the outer side, and the depth of the groove which is formed at an outermost side is set to be maximum, and the cladding diameter of the optical fiber arranged in the groove which is formed at the innermost side is set to be smallest, and the cladding diameter of the optical fiber arranged in the groove which is formed at the outer side is set to become larger progressively toward the outer side, and the cladding diameter of the optical fiber arranged in the groove which is formed at the outermost side is set to be largest, and by making such an arrangement, a line segment which has connected a center of each of the m number of optical fibers is set to be a predetermined curved shape.

4. The optical fiber array according to claim 1, wherein a material of the optical fiber aligning member is single-crystal silicon, and the groove is formed by an anisotropic etching.

5. The optical fiber array according to claim 2, wherein a material of the optical fiber aligning member is single-crystal silicon, and the groove is formed by an anisotropic etching.

6. The optical fiber array according to claim 3, wherein a material of the optical fiber aligning member is single-crystal silicon, and the groove is formed by an anisotropic etching.

* * * * *